May 29, 1951  G. W. JOHNSON  2,555,193
EGG WASHING MACHINE
Filed Dec. 27, 1945  6 Sheets-Sheet 1
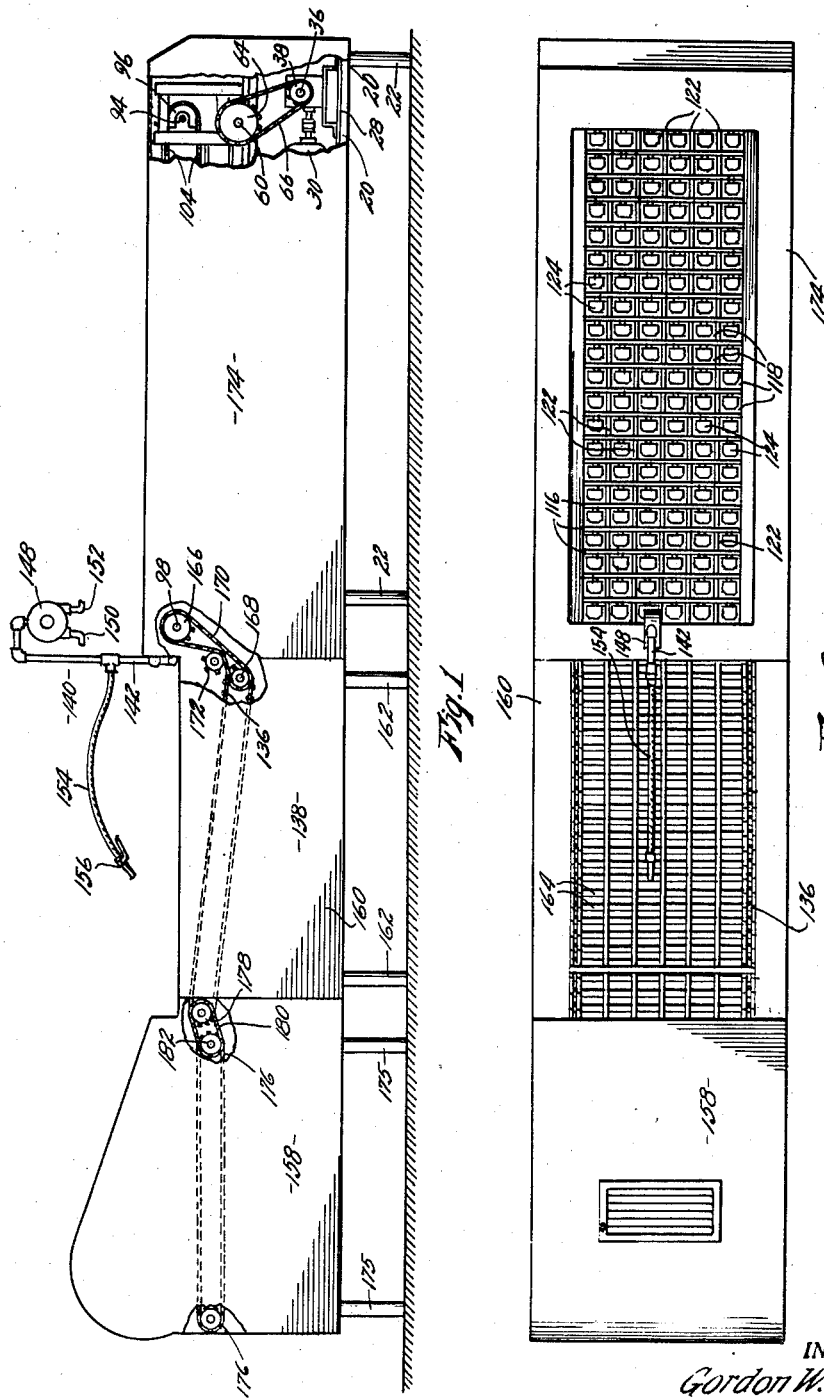
INVENTOR,
Gordon W. Johnson.
BY
Roy E. Hamilton,
Attorney.

May 29, 1951  G. W. JOHNSON  2,555,193
EGG WASHING MACHINE

Filed Dec. 27, 1945  6 Sheets-Sheet 2

INVENTOR,
Gordon W. Johnson.
BY
Roy E. Hamilton,
Attorney

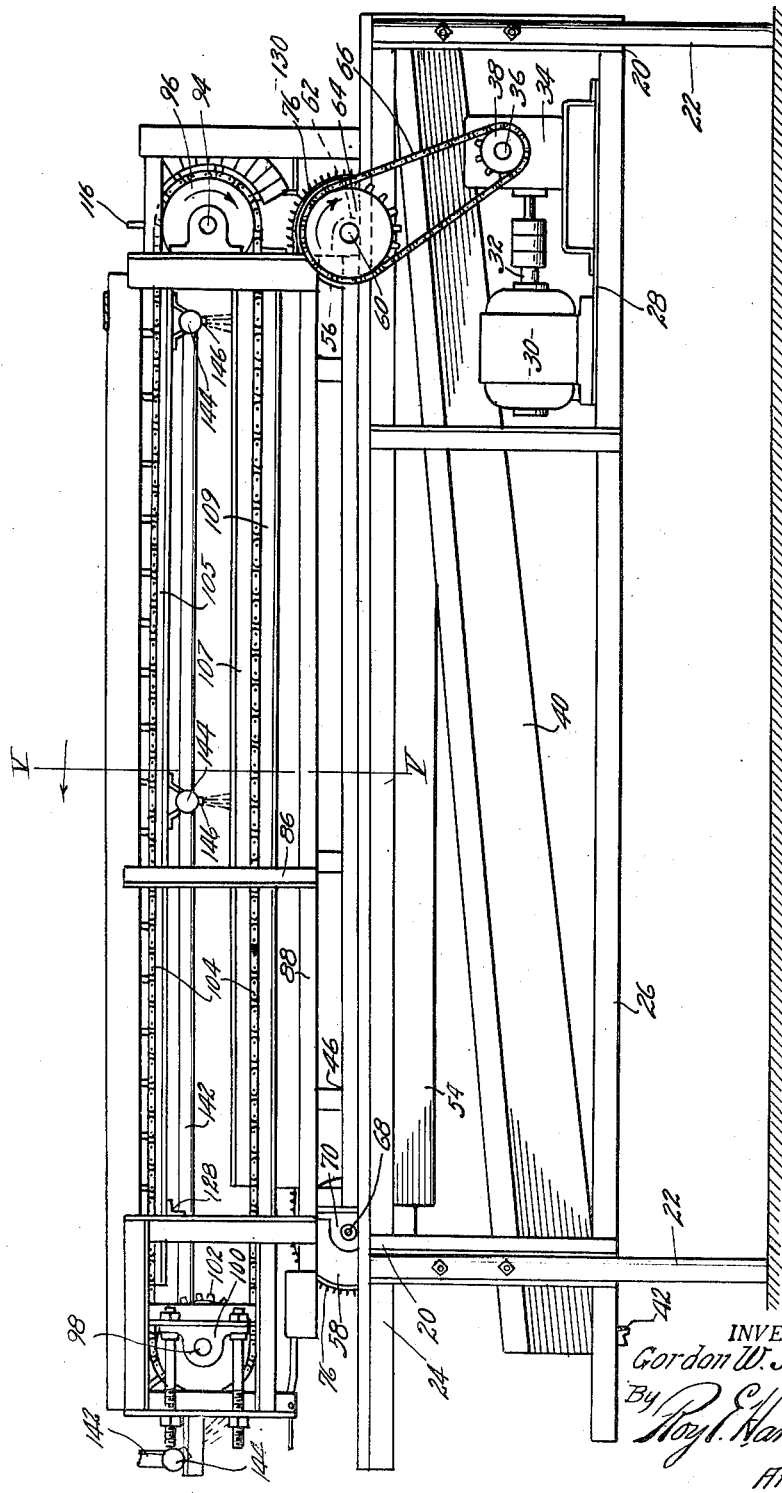

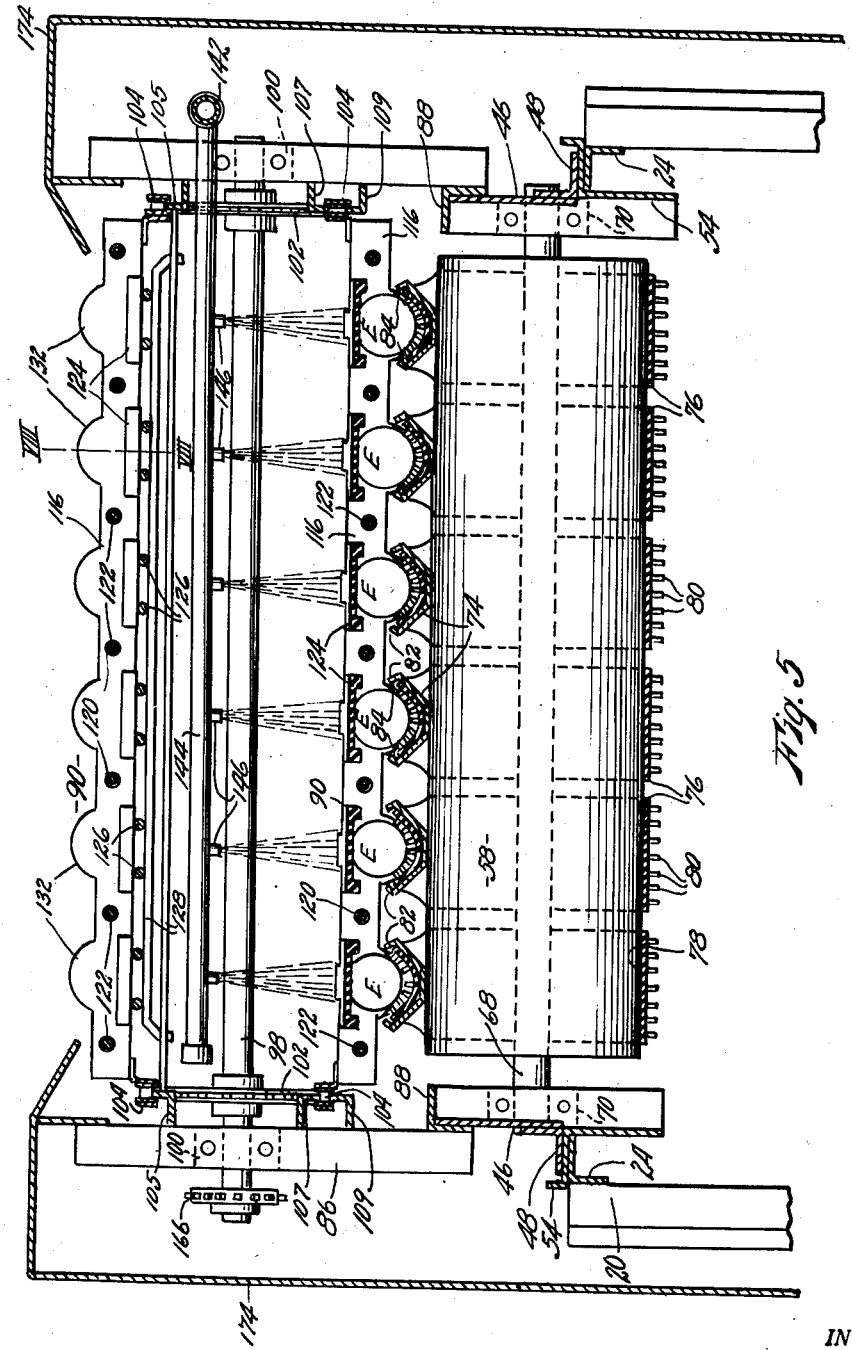

May 29, 1951  G. W. JOHNSON  2,555,193
EGG WASHING MACHINE
Filed Dec. 27, 1945  6 Sheets-Sheet 5
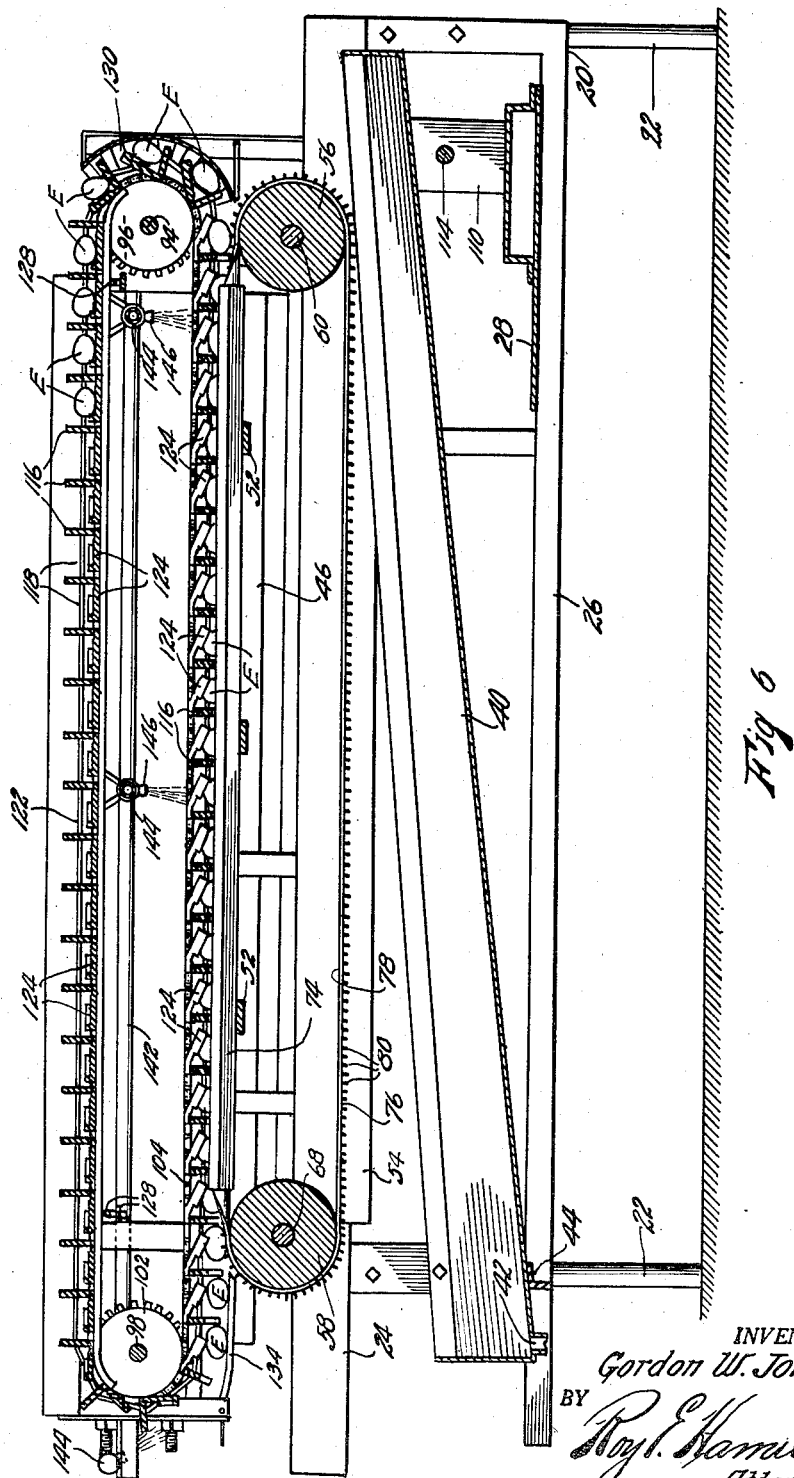
INVENTOR,
Gordon W. Johnson.
BY Roy E. Hamilton,
Attorney.

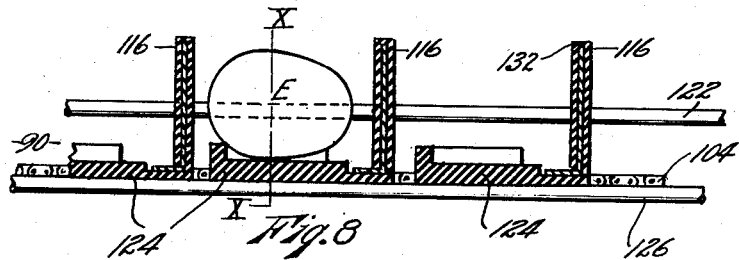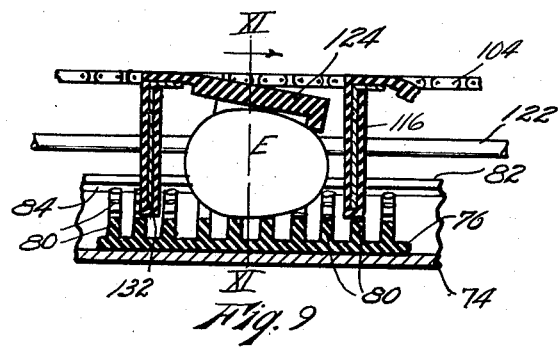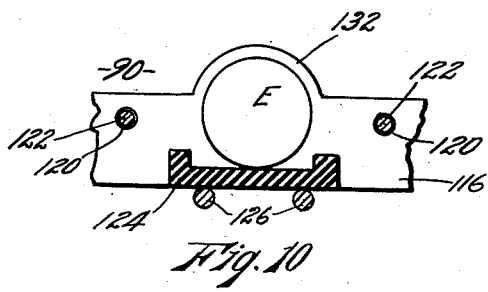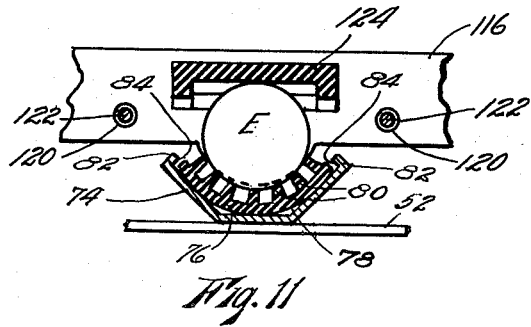

Patented May 29, 1951

2,555,193

UNITED STATES PATENT OFFICE 2,555,193

EGG WASHING MACHINE

Gordon W. Johnson, Raytown, Mo., assignor to Gordon Johnson Company, Kansas City, Mo., a corporation of Missouri Application December 27, 1945, Serial No. 637,320

3 Claims. (Cl. 198—30)

This invention relates to improvements in egg washing machines and has particular reference to a machine that will thoroughly clean fragile, various shapes and sizes of eggs with a low percentage of breakage.

This is an improvement over my co-pending application for Patent Serial No. 522,186, filed February 10, 1944, and now Patent 2,502,728 patented April 4, 1950.

The principal object of this invention is the provision of a spraying system whereby the eggs are moistened by a spray of fresh liquid as they are being scrubbed, thus insuring a constant change of liquid to the eggs being washed.

Another object is the provision of special means whereby the eggs are maintained in segregated relation during the entire egg washing operation.

A further object of this invention is the provision of an endless egg conveyor belt including a series of cross bars carrying spaced apart endless belts for forward movement relative to said cross bars.

Other objects are simplicity and economy of construction, speed and efficiency of operation, and adaptability for use in simultaneously washing poultry eggs varying in size from the smallest to the largest.

With these objects in view, as well as other objects which will appear during the course of the specification, reference will be had to the drawings, wherein:

Figure 1 is a side elevational view of an egg washing machine, and associated equipment, partly broken away and embodying this invention.

Fig. 2 is a plan view of the washing machine and associated equipment shown in Figure 1.

Fig. 4 is a side elevational view of the washing machine with parts omitted to disclose the working parts.

Fig. 5 is an enlarged cross sectional view taken on line V—V of Figure 4, with parts broken away.

Fig. 6 is a longitudinal, irregular section taken on line VI—VI of Figure 3.

Fig. 8 is an enlarged sectional view taken on line VIII—VIII of Figure 5.

Fig. 9 is an enlarged fragmentary sectional view taken on line IX—IX of Figure 5.

Fig. 10 is a cross sectional view taken on line X—X of Figure 8.

Fig. 11 is a cross sectional view taken on line XI—XI of Figure 9.

Figure 3:
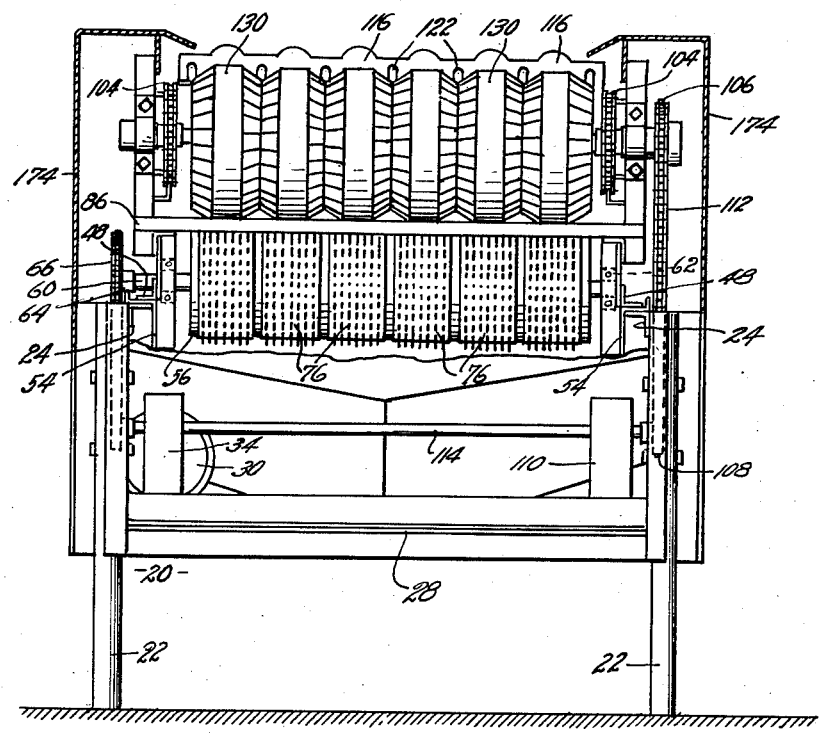
Fig. 3 is an end elevational view of the washing machine, with parts broken away.

Throughout the several views like reference characters refer to similar parts and the numeral 20 designates a base frame mounted on legs 22 and having substantially horizontally disposed top rails 24 and bottom rail 26. The bottom rails support a transverse platform 28 on which is mounted a suitable motor 30 having a shaft 32 which is directly interconnected with a speed reduction means 34 which drives a shaft 36 on which is mounted a driving sprocket 38.

Rigidly fixed to frame 20 intermediate rails 24 and 26 and extending across the frame is a rearwardly and downwardly inclined drain trough 40 having a drain pipe 42 at its lower extremity. This trough is substantially V-shaped in cross section whereby the water is collected adjacent its central portion and directed to the drain pipe 42. The cross bars 44 serve to secure together the two side portions of the base frame 20. The frame parts are preferably welded together.

A scrubber frame 46 having side rails 48 and cross bars 52 is adapted to rest on a drip plate 54 which in turn rests on top rail 24 of base frame 20. Mounted transversely of frame 46 at its opposite ends is a belt drum 56 and 58 respectively. Drum 56 is provided with a shaft 60 which is mounted for rotation adjacent its opposite ends in bearings 62 carried by frame 46. One end of shaft 60 extends beyond the side of frame 46 and is provided with a rigidly attached sprocket wheel 64 which is operatively interconnected with the driving sprocket 38 with a sprocket chain 66, so that as motor 30 is energized said drum 56 will be driven in the direction indicated by the arrow. Belt drum 58 is rigidly mounted on shaft 68 which in turn is rotatably mounted on bearing 70 affixed to frame scrubber 46.

Cross bars 52 are positioned intermediate drums 56 and 58 to serve as a base for a series of spaced apart troughs 74 which are positioned with their inside bottom surface in substantial register with a line tangent with the upper edge of the drums 56 and 58. Endless scrubber belts 76 are operatively positioned about drums 56 and 58, one belt passing through each of the troughs as clearly shown in Figure 5. These scrubber belts are made of a soft pliable material, such as rubber, which will not cause an objectionable amount of egg breakage, and will readily adapt themselves to the various sizes and shapes of eggs necessary to facilitate the proper handling of eggs during the washing operation. Belt 76 has a relatively smooth inner face 78 suitable for engaging the belt drums for driving purposes.

The outer face of the belt is provided with a large number of spaced apart papilla 80 suitable for forming an egg scrubbing surface which will adjust themselves to the contour of the various sizes and shapes of eggs. As clearly shown in Figures 5 and 11 each trough 74 is provided with overhanging longitudinal ribs 82 which form abutments 84 for the opposite edges of the scrubber belt when it is in operation to conform to the inner contour of its respective trough, thus insuring its proper positioning in the trough.

The means for conveying the eggs to and from the scrubber belts comprises a frame 86 having inturned ledges 88 suitable for resting on top of scrubber frame 46 as shown in Figure 5 and provided with an endless conveyor belt 90 mounted thereon for relatively slow orbital movement directly above the upper reaches of the scrubber belts 76 and in substantially parallel relation therewith.

Rotatably mounted in bearings 92 carried by one end of frame 86 in parallel relation with shaft 60 is a shaft 94 carrying fixed sprocket wheels 96. At the other end of frame 86 is a shaft 98 rotatably mounted in bearings 100 carried by said frame. This shaft is parallel with shaft 94 and is provided with fixed sprocket wheels 102. Sprocket chains 104 interconnect with corresponding sprocket wheels 96 and 102, and serve as a flexible framework for the conveyor belt 90. The outer extremity of shaft 94 is provided with a relatively large, fixed sprocket wheel 106 which is operatively interconnected with a sprocket wheel 108 of speed reduction unit 110 by chain 112. This speed reduction unit is carried by platform 28 in fixed relation to speed reducing means 34, by which it is driven through shaft 114. It will be noted that due to the interposition of the speed reducing means 34 and 110 in the train of driving parts from the common motor 30 to the scrubber belt and conveyor belt, the speed of the conveyor belt will be much slower than the speed of travel of the scrubber belt, furthermore, the lower reach of the conveyor belt and the upper reach of the scrubber belts, which operate to scrub the eggs, will travel in opposite directions. The upper reaches of chains 104 ride on the angled track member 105 while the lower reaches of the chain ride between the track members 107 and 109 to preclude substantially all vertical movement of the lower reaches during the scrubbing operation.

Extending in spaced apart relation between chains 104 is a continuous series of cross bars 116 which are securely attached to the chains in substantially parallel relation to form opposite front and rear walls of egg compartments 118. Each of the cross bars 116 is provided with like series of openings 120. Endless belts 122, preferably made of rubber, are respectively mounted through corresponding openings 120. The openings in these cross bars 116 are so positioned that they form side walls for the egg compartments 118 to prevent objectionable side contacting of the eggs.

As shown, the cross bars 116 are preferably made of metal coated with rubber to prevent egg breakage. Each of the cross bars is provided with a like series of tabs 124 which trail the bar and rest on the table made of parallel rods 126 which are carried by cross bars 128 of conveyor frame 86, as they move along the upper reach of their orbital travel. When the conveyor travels over sprocket wheels 96 and reverses its direction the tabs 124 will rest on top of the eggs as the eggs are forced by the conveyor belt to move along the formed trough-like portion of the scrubber belt, thus precluding objectionable bouncing of the egg and also facilitating the egg washing operation. These tabs are made of some cushioning material, such as rubber, and serve to receive the egg from above when charging the machine, to prevent breakage.

When the endless conveyor belt is in operation the endless belts 122 carried thereby will be caused to travel at a higher rate of speed than belt 90, thus providing a forward movement of belts 122 in the cross bars 116 which tends to centralize the eggs in their compartments 118 and also keep the openings clean. This differential of forward speed of the conveyor belt 90 and endless belts 122 is caused by the opening and closing action of the cross bars as the conveyor belt is moved about the sprocket wheels 96.

For properly guiding the eggs about the sprocket wheels 96 an arcuate trough member 130 secured to the frame 86 is provided for each row of eggs. At one stage of its travel, the egg will be in a substantially vertical line of travel, and will rest against the enlarged arcuate portions 132 of cross bar 116. Furthermore, when the egg is positioned in the trough-like portion of the upper reach of the scrubber belt 76, this arcuate portion 132 of the cross bar will reach into the trough to force the egg along its direction of travel, while resting on the scrubber belt which is simultaneously moving at a greater speed in the opposite direction. It is quite evident that by simply varying the relative speeds of the conveyor belt and the scrubber belt any desired scrubbing action may be obtained to thoroughly clean the eggs. It will be noted that the conveyor belt at the delivery end overhangs the end of the scrubber belt, thus making it possible to move the washed eggs over the stationary members 134 and onto the conveyor 136 of the inspection table 138.

An important feature of the washer is a liquid spraying means 140 whereby the eggs being scrubbed are sprayed with water or any other liquid suitable for facilitating the cleaning operation. This spraying means carried by sprayer 86 comprises a feed pipe 142 provided with branch pipes 144 each provided with a series of spray nozzles 146 by means of which a liquid spray is directed to each row of eggs as they enter the scrubber zone, during the scrubbing operation and as they leave the washer and pass to the inspection table.

Feed pipe 142 is provided with a mixing valve 148, which is connected with a hot water pipe 150 and a cold water pipe 152 whereby water of any desired predetermined temperature is delivered to the feed pipe. These hot and cold water pipes are preferably of the normal water system whereby the water is under a pressure to force the liquid through the nozzles in a spray against the eggs. A branch hose 154 provided with a valve controlled spray nozzle 156 communicates with feed pipe 142 and is adapted for use in cleaning eggs passing over the inspection table. It will be noted that certain of the branch pipes extend transversely across the table intermediate the upper and lower reaches of the conveyor belt to deliver water to the upper reach of the scrubber belt. This water, once used, drains to the trough 40 and is drained from the machine.

The conveyor 136 of the inspection table 138 is used in conjunction with the washer to inspect the washed eggs and for delivering them to a drier 158. This inspection table comprises a body member 160 mounted on legs 162 and serves to convey the washed eggs from the washer and to simultaneously roll them on the conveyor to facilitate partial drying of the eggs.

Since it is contemplated to drive the inspection conveyor by means of the washer motor 30, a sprocket wheel 166 is operatively secured to shaft 98 and is interconnected with shaft 168 of the inspection table 138 by chain 170. An idler sprocket 172 serves to tighten the chain on the sprockets. Whenever the conveyor belt 90 is rotated by the motor 30 the inspection table conveyor belt will be operated at a speed calculated to take care of the eggs as they are discharged from the washer.

The drier 158 is mounted on legs 175 and has a conveyor belt 176 which is driven by conveyor belt 136 of the inspection table 138 through a sprocket wheel 178, chain 180 and sprocket wheel 182, mounted as shown in Figure 1. It is not intended to claim the drier per se but only to show the continuous driving relation of the associated parts whereby they are timed to properly care for the travel of the eggs therethrough.

To cover the moving parts and protect the machinery of the washer, a housing 174 is provided.

In the operation of the egg washer, motor 30 is energized to drive the scrubber belt 76 and conveyor belt 90 in like directions so that the lower reach of the conveyor belt and the upper reach of the scrubber belt, will move in opposite directions. The speed of the scrubber belt is relatively greater than the speed of the conveyor belt. The operator now places the eggs E in segregated relation in the compartments 118 formed by the endless conveyor belts 90 and the cross bars 116. The eggs rest on the tabs 124, carried by the cross bars 116, which rest on the rods 126. The eggs are carried around shaft 94 as clearly shown in Figure 6 are delivered to the corresponding scrubber belt 76 which is cupped transversely as clearly shown in Figure 5.

The liquid spraying means 140 is turned on so as to spray the eggs with warm water so that they are moist during the scrubbing operation.

It will be noted that the tabs 124 on the lower reach of the conveyor belt are so positioned that they rest on top of the eggs which are resting on the upper reach of the scrubber belt. This positioning of the egg feeds it along the scrubber belt in a direction opposed to the direction of travel of the scrubber belt and at a rate of speed sufficient to permit the proper cleaning of the eggs before they are delivered to the stationary member 134 thence to the inspection table conveyor 136, and on to the drier. This operation is continuous and the relative speeds of the parts may be so related and controlled as to obtain the desired cleaning of the various types of dirty eggs.

Figure 7:
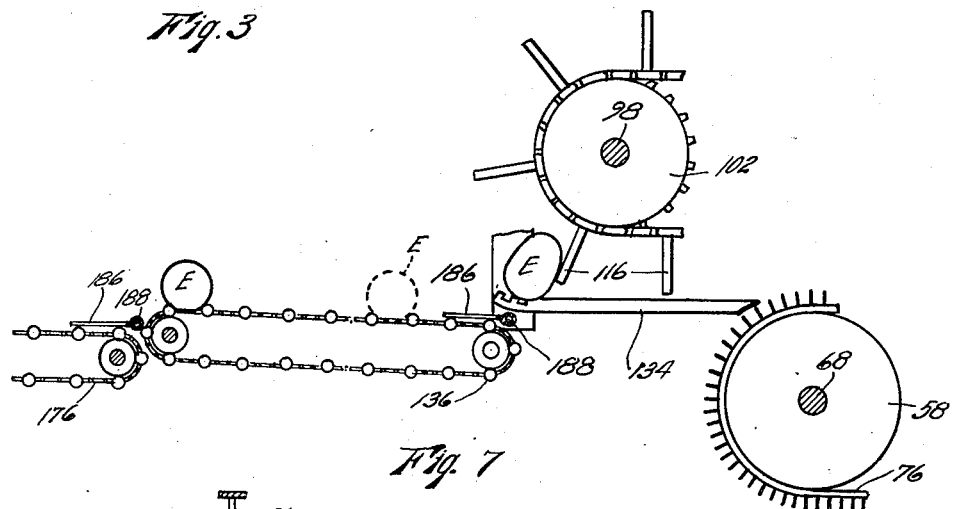
Fig. 7 is an enlarged diagrammatic view showing the means for the delivery of the washed eggs from the washing machine to the associated equipment.
Figure 12:
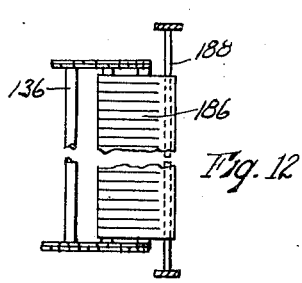
Fig. 12 is a diagrammatic plan view of the delivery means shown in Figure 7.

Referring to Figures 7 and 12 it will be noted that the eggs E are delivered from the conveyor 90 to the conveyor belt 136 of the inspection table, which is positioned slightly therebelow, and onto a fixed rubber buffer 186 carried by conveyor frame 86, to absorb the shock of the egg to prevent breakage. This rubber buffer is mounted on a rod 188 and is slit inwardly from its free edge to form a comb-like structure.

What is claimed as new and is desired to be protected by Letters Patent is:

1. In an egg washing machine, a movable, endless conveyor provided with a plurality of egg-receiving compartments; and means defining said compartments including a number of spaced, substantially parallel perforated bars mounted on the conveyor for movement therewith and disposed in transverse relationship to the path of travel of the conveyor, and a number of spaced, endless belts circumscribing the conveyor and passing through the perforations of the bars in substantially perpendicular relationship thereto.

2. In an egg washing machine, a movable, endless conveyor provided with a plurality of egg-receiving compartments; and means defining said compartment including a number of spaced, substantially parallel perforated bars mounted on the conveyor for movement therewith and disposed in transverse relationship to the path of travel of the conveyor, and a number of spaced, endless belts circumscribing the conveyor and passing through the perforations of the bars in substantially perpendicular relationship thereto, said belts being shiftable in said perforations for movement relative to the bars.

3. In an egg washing machine, a movable, endless, elliptical conveyor provided with a plurality of egg-receiving compartments; and means defining said compartment including a number of spaced, substantially parallel, perforated bars mounted on the conveyor for movement therewith and disposed in transverse relationship to the path of travel of the conveyor, and a number of spaced, endless elastic belts circumscribing the conveyor and passing through the perforations of the bars in substantially perpendicular relationship thereto, said belts being shiftable in said perforations for movement relative to the bars.

GORDON W. JOHNSON.

REFERENCES CITED

The following references are of record in the file of this patent:

UNITED STATES PATENTS

| Number | Name | Date |
| --- | --- | --- |
| 1,138,356 | Conte | May 4, 1915 |
| 1,689,653 | Wayland | Oct. 30, 1928 |
| 1,730,157 | McDonald | Oct. 1, 1929 |
| 1,776,784 | Cramer | Sept. 30, 1930 |
| 2,096,228 | Dudgeon | Oct. 19, 1937 |
| 2,187,842 | Rheinstrom | Jan. 23, 1940 |
| 2,408,648 | Inman | Oct. 1, 1946 |
| 2,412,565 | Davis | Dec. 17, 1946 |
| 2,442,475 | Swanson | June 1, 1948 |